(12) United States Patent
Kita

(10) Patent No.: US 6,305,658 B1
(45) Date of Patent: Oct. 23, 2001

(54) AUTOMOTIVE POWER SEAT SLIDING DEVICE

(75) Inventor: Shinichiro Kita, Yokohama (JP)

(73) Assignee: Johnson Controls Automotive Systems Corporation, Ayase (JP)

( * ) Notice: Subject to any disclaimer, the term of this patent is extended or adjusted under 35 U.S.C. 154(b) by 0 days.

(21) Appl. No.: 09/465,695

(22) Filed: Dec. 17, 1999

(30) Foreign Application Priority Data

Dec. 18, 1998 (JP) .................................................. 10-361169

(51) Int. Cl.[7] .................................................. F16M 13/00
(52) U.S. Cl. .......................... 248/424; 248/429; 248/422; 248/421
(58) Field of Search .................................. 248/424, 429, 248/422, 421

(56) References Cited

U.S. PATENT DOCUMENTS

| 5,273,242 | * | 12/1993 | Mouri et al. | 248/429 |
|---|---|---|---|---|
| 5,275,457 | * | 1/1994 | Satoh et al. | 296/65.1 |
| 5,707,035 | * | 1/1998 | Kargol et al. | 248/429 |
| 5,765,798 | * | 6/1998 | Isomura | 248/430 |
| 5,816,555 | * | 10/1998 | Ito et al. | 248/429 |
| 5,823,499 | * | 10/1998 | Ito et al. | 248/429 |
| 5,938,164 | * | 8/1999 | Kargol et al. | 248/429 |
| 6,089,665 | * | 7/2000 | Andrigo | 297/344.1 |

FOREIGN PATENT DOCUMENTS

| 0 301 461 | 2/1989 | (EP) | 248/429 |
|---|---|---|---|
| 0 589 218 | 3/1994 | (EP) | 248/429 |
| 6-336130 | 12/1994 | (JP) . | |

* cited by examiner

*Primary Examiner*—Leslie A. Braun
*Assistant Examiner*—A. Joseph Wujciak
(74) *Attorney, Agent, or Firm*—Foley & Lardner

(57) ABSTRACT

An automotive power seat sliding device comprises first and second lower rails secured to a vehicle floor; first and second upper rails slidably and respectively engaged with the first and second lower rails and supporting thereon a seat; a cross beam member having both ends secured to the first and second upper rails respectively, so that the first and second upper rails slide on and along the first and second lower rails like a single unit; a drive shaft extending along the first upper rail and having a spiral groove formed therearound; a nut member secured to the first lower rail and operatively engaged with the drive shaft; an electric power unit supported by the cross beam member for rotating the drive shaft about an axis thereof; a supporting member connected to the first upper rail for rotatably supporting one end portion of the drive shaft; and a protector bracket secured to the first upper rail and having a recessed structure into which the other end of the drive shaft is received without contacting the recessed structure.

6 Claims, 7 Drawing Sheets

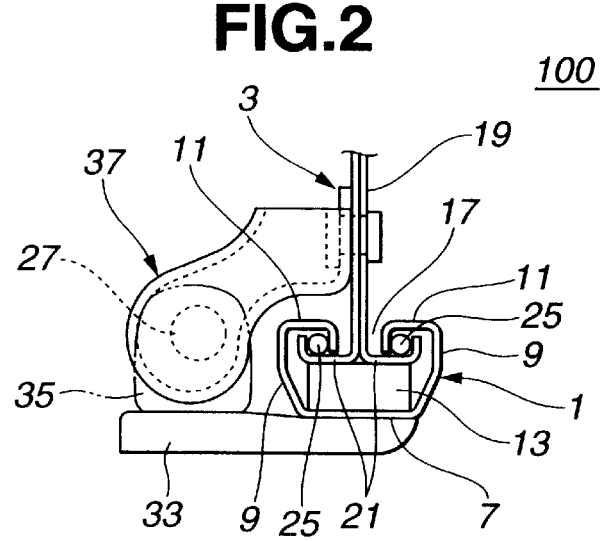
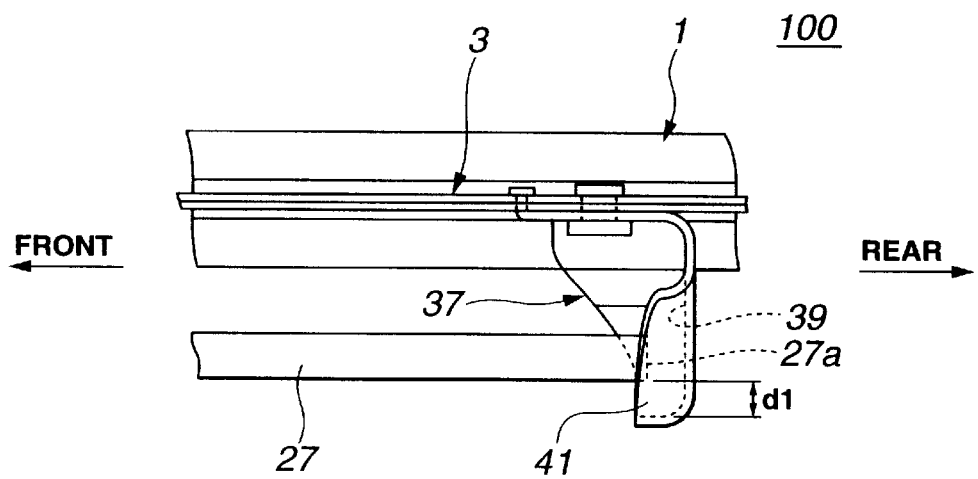
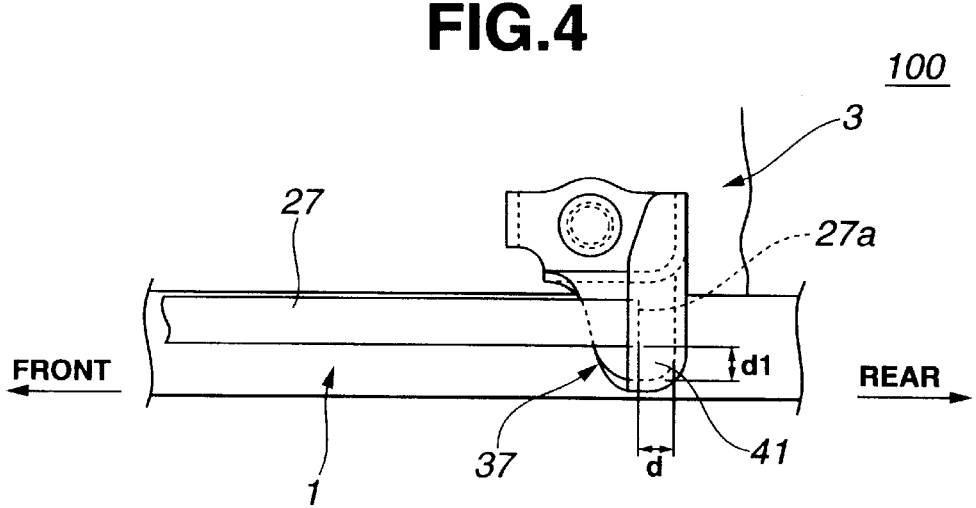

US 6,305,658 B1

AUTOMOTIVE POWER SEAT SLIDING DEVICE

BACKGROUND OF THE INVENTION

1. Field of the Invention

The present invention relates in general to seat sliding devices of motor vehicles, and more particularly to the seat sliding device of a power type which can slide the seat to a desired position with an electric power. More specifically, the present invention is concerned with the power seat sliding device which can exhibit a satisfied durability against big shock applied thereto due to a vehicle collision or the like.

2. Description of the Prior Art

Hitherto, various power seat sliding devices have been proposed and put into practical use particularly in the field of motor vehicles. For providing the devices with a satisfied durability against a big shock applied thereto due to a vehicle collision or the like, various measures have been hitherto taken.

One of conventional power seat sliding devices having a certain durability against such shock is shown in Japanese Patent First Provisional Publication 6-336130. The power seat sliding device of this publication comprises generally a pair of lower rails fixed to a vehicle floor, a pair of upper rails slidably engaged with the lower rails and supporting thereon a seat, a drive shaft rotatably held by one of the upper rails and having a spiral groove formed therearound, an electric motor carried by the upper rails for driving the drive shaft, and a nut member fixed to one of the lower rails and operatively engage with the drive shaft.

Thus, when the electric motor is energized to rotate the drive shaft in one or other direction, the upper rails and thus the seat are moved forward or rearward on the lower rails to a desired position.

SUMMARY OF THE INVENTION

It is an object of the present invention to provide an automotive power seat sliding device, which can exhibit a satisfied durability against a big shock applied thereto due to a vehicle collision or the like.

According to the present invention, there is provided an automotive power seat sliding device, which comprises first and second lower rails adapted to be secured to a floor of a vehicle; first and second upper rail slidably and respectively engaged with the first and second lower rails and adapted to support thereon a seat; a cross beam member having both ends secured to the first and second upper rails respectively, so that the first and second upper rails slide on and along the first and second lower rails like a single unit; at least one drive shaft extending along the first upper rail and having a spiral groove formed therearound; a nut member secured to the first lower rail and operatively engaged with the drive shaft; an electric power unit supported by the cross beam member for rotating the drive shaft about an axis thereof; a supporting member connected to the first upper rail for rotatably supporting one end portion of the drive shaft; and a protector bracket secured to the first upper rail and having a recessed structure into which the other end of the drive shaft is received without contacting the recessed structure.

BRIEF DESCRIPTION OF THE DRAWINGS

Other objects and advantages of the present invention will become apparent from the following description when taken in conjunction with the accompanying drawings, in which:

FIG. 2 is an illustration taken from the direction of the arrow "A" of FIG. 1;

FIG. 3 is plan view of a part of the power seat sliding device of the first embodiment, showing a protector bracket for a drive shaft;

FIG. 4 is a side view of the part of the power seat sliding device, showing the protector bracket for the drive shaft;

DETAILED DESCRIPTION OF THE EMBODIMENTS

Figure 1:
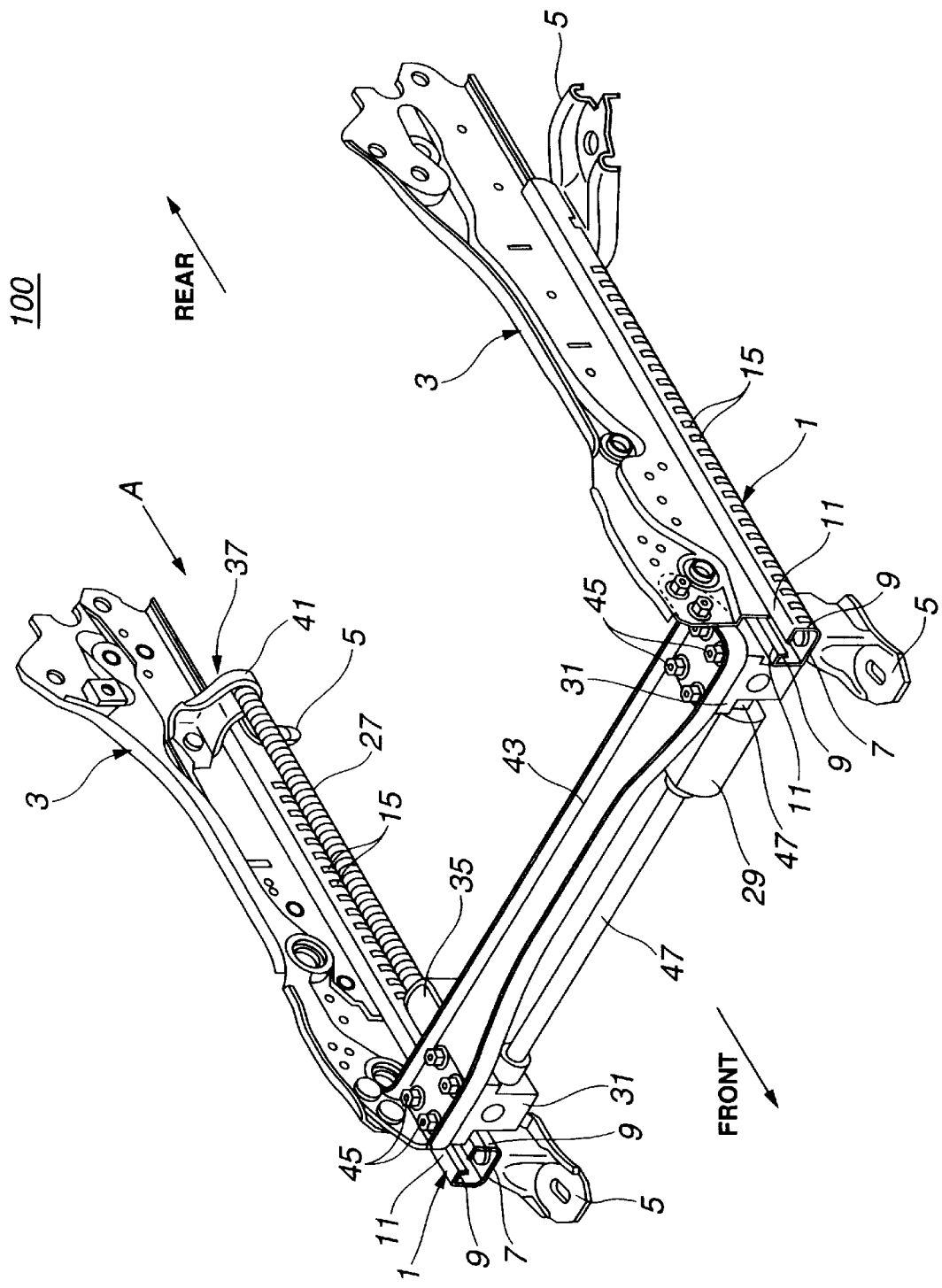
FIG. 1 is a perspective view of an automotive power seat sliding device which is a first embodiment of the present invention.

Referring to FIGS. 1 to 4, particularly FIG. 1 of the drawings, there is shown an automotive power seat sliding device 100 which is a first embodiment of the present invention.

As shown in FIG. 1, the automotive power seat sliding device 100 comprises generally two lower rails 1 which are fixed to a vehicle floor and two upper rails 3 which are slidably engaged with the lower rails 1 and supports thereon a seat proper (not shown). Although not shown in the drawing, one end of a seat belt is fixed to a rear end portion of one of the upper rails 3.

Each lower rail 1 has front and rear ends mounted on front and rear mounting brackets 5 which are bolted to the vehicle floor.

As is understood from FIG. 2, each lower rail 1 comprises a longitudinally extending flat base portion 7, two side wall portions 9 which are integral with and extend longitudinally along side edges of the flat base portion 7, and two thin outer guide portions 11 which extend toward each other from upper ends of the respective side wall portions 9. Inward edges of the outer guide portions 11 are bent inwardly, that is, toward the flat base portion 7. Thus, between the bent edges of the outer guide portions 11, there is defined a longitudinally extending slot 17.

For rotatably supporting thereon the corresponding upper rail 3, a plurality of cylindrical rollers 13 are rotatably put on the flat base portion 7 of the lower rail 1. That is, each roller 13 is arranged to run longitudinally on and along the flat base portion 7.

As is seen from FIG. 1, the side wall portions 9 of each lower rail 1 are each formed with a plurality of lock openings 15. It is however to be noted that these lock openings 15 are necessary only when the seat sliding device 100 is designed as a manual type, as will become apparent hereinafter.

Referring back to FIG. 2, each upper rail 3 is constructed of two rail members which are connected to each other in a back-to-back back connecting manner. The upper rail 3 comprises a vertical wall portion 19 which extends longitudinally in and along the slot 17 of the corresponding lower rail 1, and two thin inner guide portions 21 which are put in the lower rail 1 and extend in opposed directions from a lower end of the vertical wall portion 19. Outward edges of the inner guide portions 21 are bent upward, that is, toward the respective outer guide portions 11 of the lower rail 1.

As is seen from FIG. 2, due to provision of the inwardly bent edges of the outer guide portions 11 and the upwardly bent edges of the inner guide portions 21, there are defined two longitudinally extending spaces (no numeral) for receiving therein ball bearings 25. More specifically, the ball bearings 25 are located at front and rear end portions of the longitudinally extending spaces. For placing the ball bearings in such locations, retainers (not shown) are fixed to the inner guide portions 21 of the upper rail 3. The cylindrical rollers 13 put on the flat base portion 7 of the lower rail 1 rotatably support thereon the respectively inner guide portions 21 of the upper rail 3. More specifically, the cylindrical rollers 13 are located at front and rear end portions of the flat base portion 7. For placing the rollers 13 at such locations, retainers (not shown) are fixed to the lower rail 1.

Referring back to FIG. 1, there are arranged at inner sides of the upper rails 3 two drive shafts 27 (only one is shown) each extending longitudinally along the upper rail 3. As will become apparent as the description proceeds, these two drive shafts 27 are supported by the upper rails 3 and driven in one and other directions by a single electric motor 29 supported by the upper rails 3.

As shown in FIG. 1, each upper rail 3 has at its front end a transmission case 31. Each case 31 rotatably supports a front end portion of the corresponding drive shaft 27. The case 31 installs therein a transmission mechanism which includes two mutually engaged bevel gears.

As is seen from FIGS. 1 and 2, each drive shaft 27 has a nut member 35 operatively engaged therewith. As is seen from FIG. 2, each nut member 35 is secured to a bracket 33 extending from the lower rail 1. Thus, when the drive shaft 27 is rotated in one direction, the same is forced to move longitudinally forward or rearward relative to the fixed nut member 35 thereby to move the upper rails 3 and thus the seat (not shown) in the same direction relative to the fixed lower rails 1.

As is shown in FIG. 1, a cross beam member 43 has both ends bolted to the front ends of the upper rails 3 and has the transmission cases 31 fixed thereto by means of bolts 45. One of the bevel gears in each case 31 is connected to the front end of the corresponding drive shaft 27.

An elongate transmission shaft 47 transversely extends between the transmission cases 31, which has ends each being connected to the other bevel gear in the corresponding case 31. An electric motor 29 is fixed to a lower surface of the cross beam member 43 to drive the transmission shaft 47.

Thus, when, upon energization of the electric motor 29, the transmission shaft 47 is rotated in one direction, the rotation is transmitted to both the drive shafts 27 through the respective transmission mechanisms in the transmission cases 31. Thus, the upper rails 3, that is, the seat (not shown) on the upper rails 3 is moved forward or rearward relative to the fixed lower rails 1.

In the first embodiment 100, the following measures are further employed.

That is, as is seen from FIG. 1, a protector bracket 37 is secured to a rear end portion of each upper rail 3 in such a manner as to cover a rear end portion of the corresponding drive shaft 27. The protector bracket 37 is constructed of a rigid metal.

As is understood from FIGS. 3 and 4, the protector bracket 37 comprises a rear wall 39 which faces a rear end 27a of the drive shaft 27 and a surrounding wall 41 which is integral with the rear wall 39 and surrounds a rear end portion of the drive shaft 27.

It is to be noted that under normal condition, the rear end 27a of the drive shaft 27 is slightly spaced away from the protector bracket 37, that is to say, the rear end 27a is not contact with the protector bracket 37. As is seen from FIG. 4, the rear end 27a of the drive shaft 27 is spaced from the rear wall 39 of the bracket 37 by the distance of "d", and as is seen from FIG. 3, the rear end 27a is spaced from the surrounding wall 41 of the bracket 37 by the distance of "d1".

Figure 5:
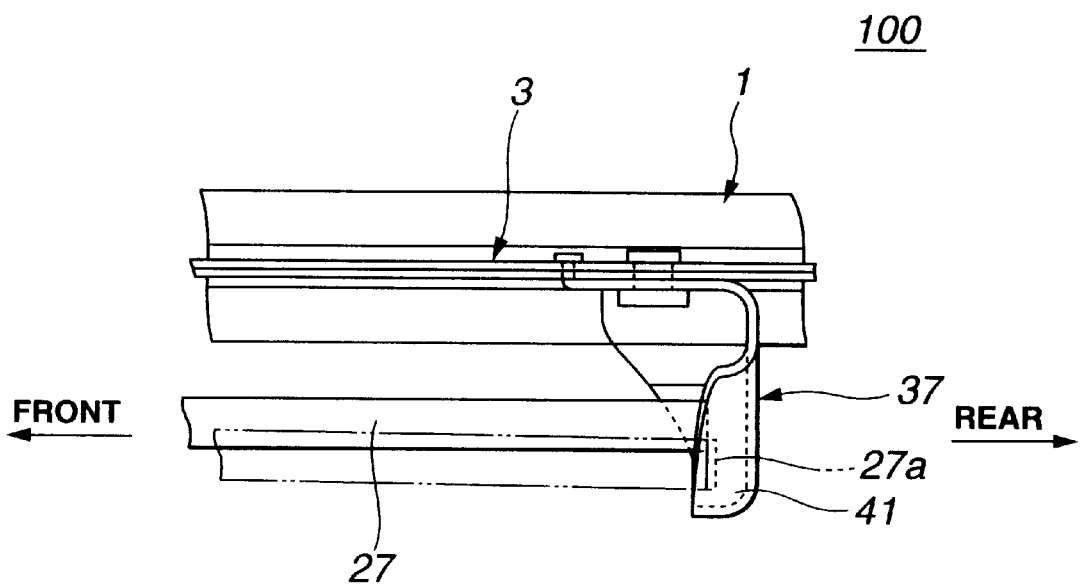
FIG. 5 is a view similar to FIG. 3, but showing a condition wherein the drive shaft is permitted to swing without contacting the protector bracket.
Figure 6:
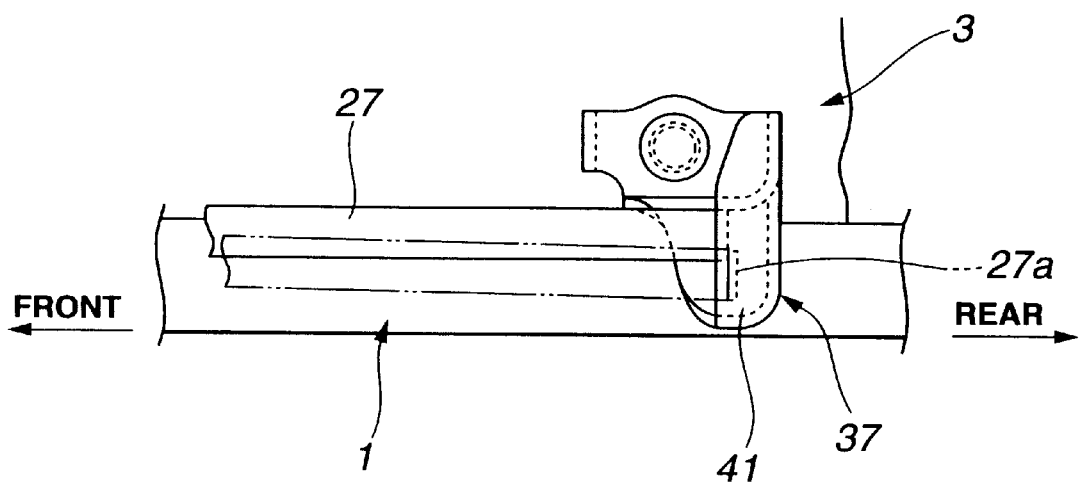
FIG. 6 is a view similar to FIG. 4, but showing a condition wherein the drive shaft is permitted to swing without contacting the protector bracket.

Thus, under normal condition, each drive shaft 27 can rotate freely without contacting the corresponding protector bracket 37. That is, as is seen from FIGS. 5 and 6, even if the drive shaft 27 is subjected to a vibration under rotation thereof as is illustrated by a phantom line, the rear end portion 27a of the drive shaft 27 is suppressed from contacting or engaging with the protector bracket 37. This brings about a smoothed rotation of the drive shaft 27 inducing a smoothed forward or rearward movement of the upper rails 3 and thus the seat mounted on the rails 3.

Figure 7:
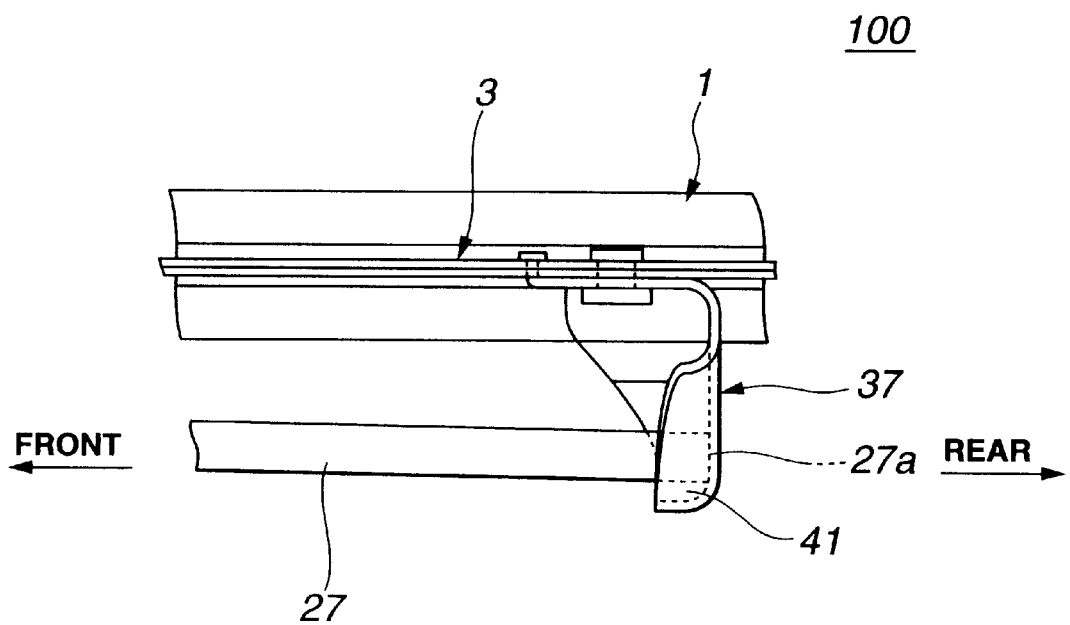
FIG. 7 is a view similar to FIG. 3, but showing a condition wherein the drive shaft is engaged with the protector bracket thereby to suppress undesired separation of the upper rail from the lower tail.
Figure 8:
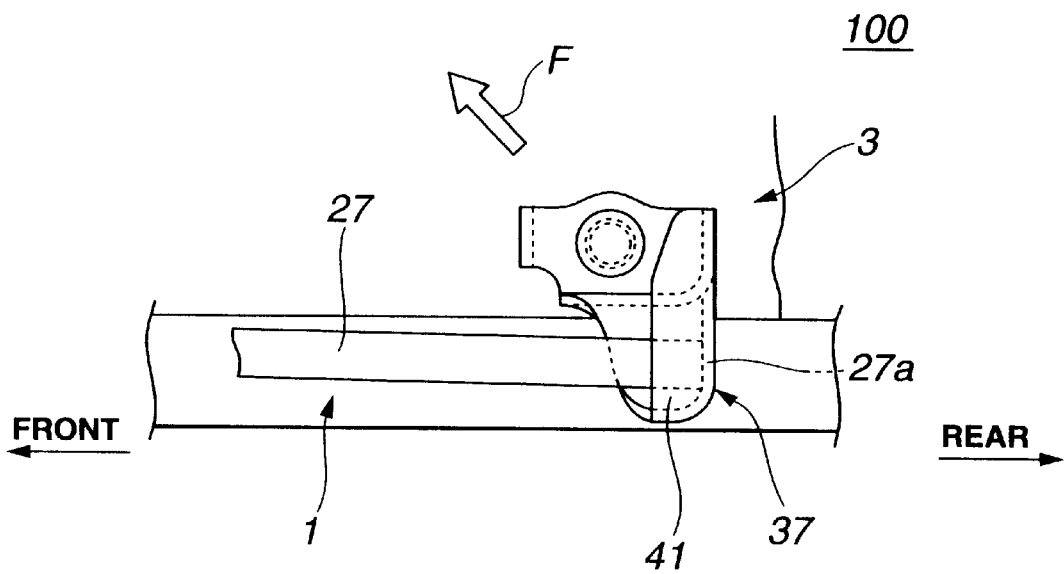
FIG. 8 is a view similar to FIG. 4, but showing a condition wherein the drive shaft is engaged with the protector bracket thereby to suppress undesired separation of the upper rail from the lower tail.

While, as is seen from FIGS. 7 and 8, if, due to a vehicle collision or the like, an abnormally large force "F" (see FIG. 8) is suddenly applied to the upper rail 3 through the seat belt (not shown), the upper rail 3 is forced to incline forward relative to the corresponding lower rail 1. However, when the inclination of the upper rail 3 exceeds a certain level defined by the above-mentioned spaces "d" and "d1", the protector bracket 37 secured to the upper rail 3 is brought into abutment with the rear end portion 27a of the drive shaft 27. In this condition, the drive shaft 27 serves as a reinforcing means, and thus, thereafter, the inclination movement of the upper rail 3 is suppressed. Thus, undesired separation of the upper rail 3 from the lower rail 1 is assuredly prevented.

Referring to FIGS. 9 to 14, there is shown an automotive power seat sliding device 200 which is a second embodiment of the present invention.

Since the second embodiment 200 is similar in construction to the above-mentioned first embodiment 100, only parts and construction which are different from those of the first embodiment 100 will be described in detail in the following for simplification of the description.

Figure 9:
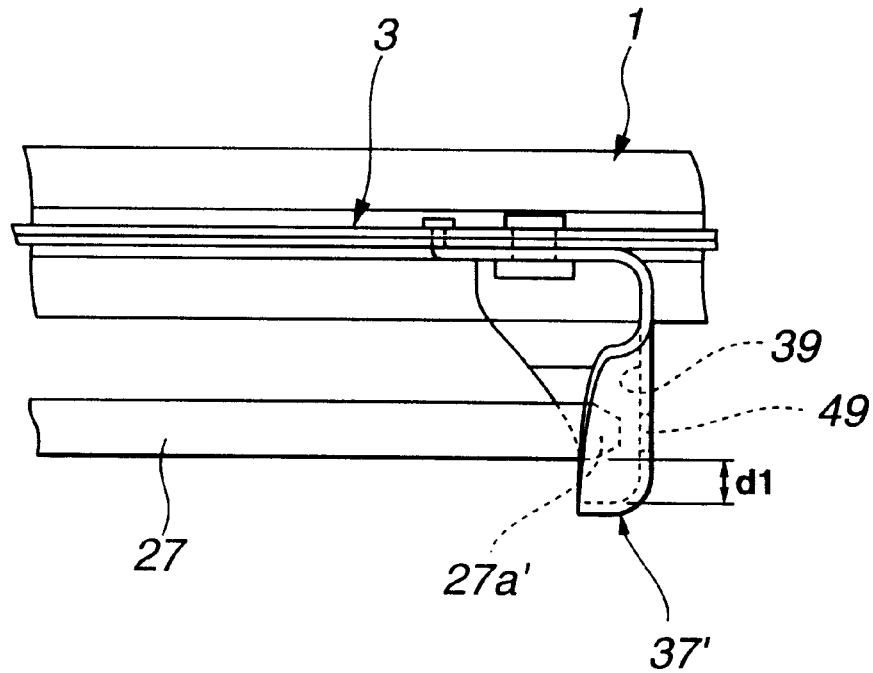
FIG. 9 is a view similar to FIG. 3, but showing a second embodiment of the present invention.
Figure 10:
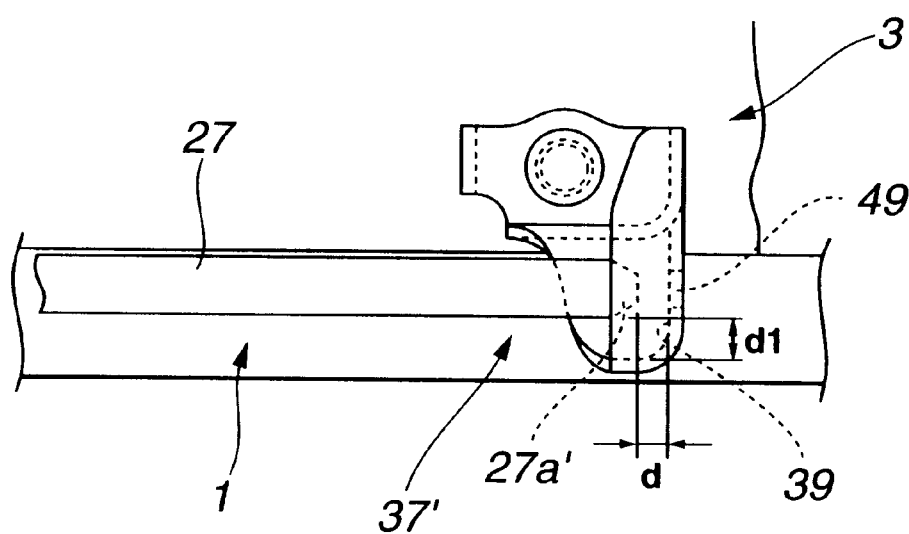
FIG. 10 is a view similar to FIG. 4, but showing the second embodiment.

As is seen from FIGS. 9 and 10, the protector bracket 37' used in the second embodiment 200 has substantially the same shape as that 37 of the first embodiment 100. However, in the second embodiment 200, a circular opening 49 is formed in the rear wall 39 of the protector bracket 37'. The diameter of the opening 49 is smaller than the diameter of the drive shaft 27.

Furthermore, in this second embodiment 200, the rear end 27a' of the drive shaft 27 is tapered. Under normal condition, the protector bracket 37' and the drive shaft 27 are so arranged that the opening 49 faces the tapered rear end 27a' of the drive shaft 27 keeping a certain clearance "d", "d1" therebetween.

Thus, under normal condition, each drive shaft 27 can rotate freely without contacting the corresponding protector bracket 37', like in the case of the first embodiment 100. That is, as is seen from FIGS. 13 and 14, even if the drive shaft 27 is subjected to a vibration under rotation thereof as is illustrated by a phantom line, the rear end portion 27a' of the drive shaft 27 is suppressed from contacting or engaging with the protector bracket 37'.

Figure 11:
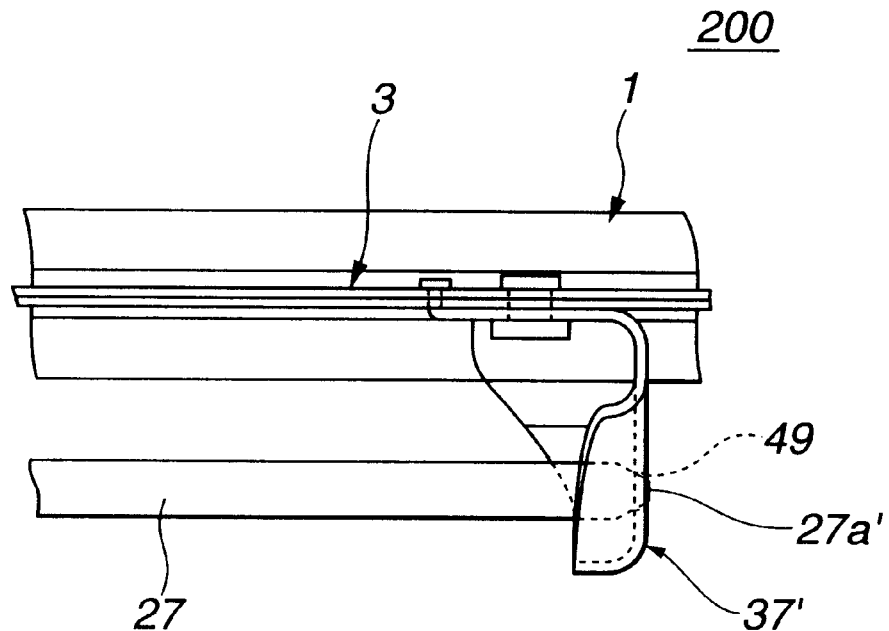
FIG. 11 is a view similar to FIG. 9, but showing a condition wherein in the second embodiment a drive shaft is engaged with a protector bracket thereby to suppress undesired separation of the upper rail from the lower tail.
Figure 12:
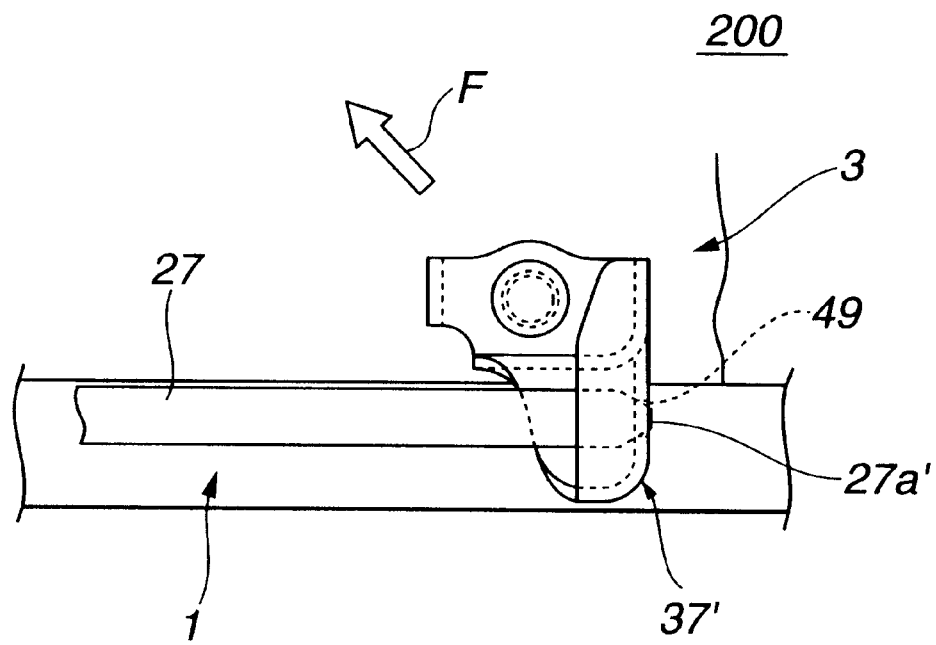
FIG. 12 is a view similar to FIG. 12, but showing a condition wherein in the second embodiment the drive shaft is engaged with the protector bracket thereby to suppress undesired separation of the upper rail from the lower tail.
Figure 13:
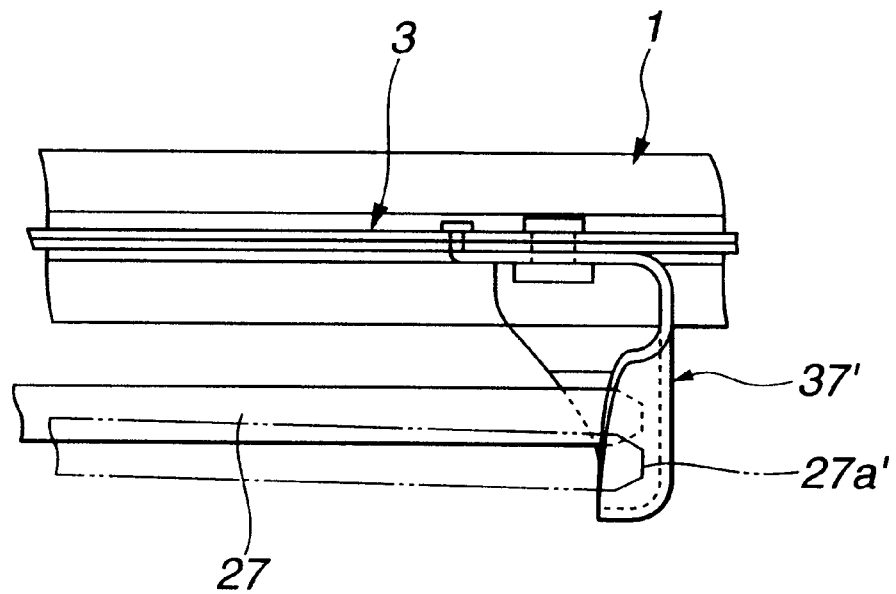
FIG. 13 is view similar to FIG. 9, but showing a condition wherein in the second embodiment the drive shaft is permitted to swing without contacting the protector bracket.
Figure 14:
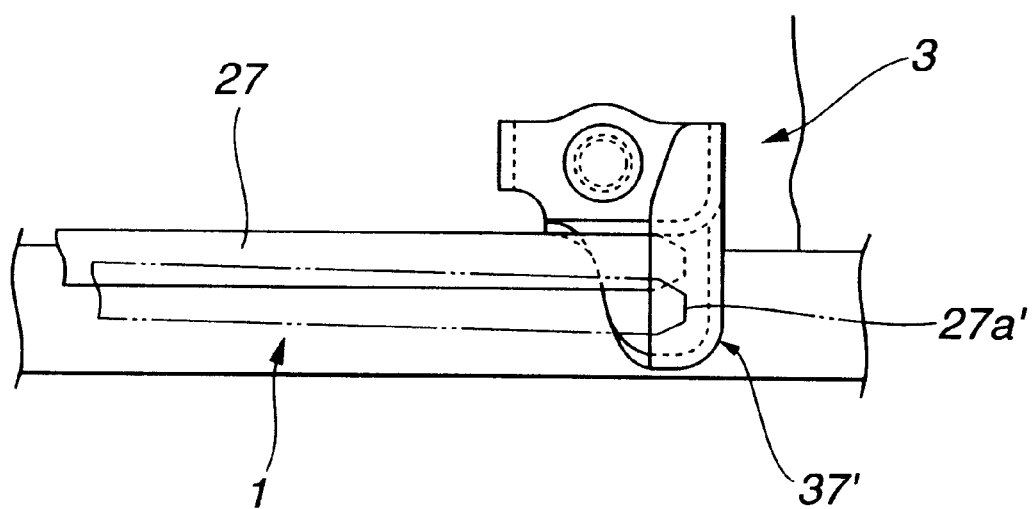
FIG. 14 is a view similar to FIG. 10, but showing a condition wherein the drive shaft is permitted to swing without contacting the protector bracket.

While, as is seen from FIGS. 11 and 12, if, due to a vehicle collision of the like, an abnormally large force "F" (see FIG. 12) is suddenly applied to the upper rail 3 through the seat belt (not shown), the upper rail is forced to incline forward relative to the corresponding lower rail 1. However, when the inclination of the upper rail 3 exceeds a certain level, the protector bracket 37' secured to the upper rail 3 is brought into abutment with the tapered rear end portion 27a' of the drive shaft 27 and finally the circular opening 49 of the protector bracket 37' receives therein the tapered end 27a' of the drive shaft 27. That is, upon this, a so-called locked condition is established between the protector bracket 37' and the drive shaft 27, and thus, thereafter, the inclination movement of the upper rail 3 is assuredly suppressed using the drive shaft 27 as a reinforcing means. Due to establishment of the locked condition, the undesired separation of the upper rail 3 from the lower rail 1 is much assuredly prevented.

The entire contents of Japanese Patent Application P10-361169 (filed Dec. 18, 1998) are incorporated herein by reference.

Although the invention has been described above with reference to certain embodiments of the invention, the invention is not limited to the embodiments described above. Various modifications and variations of the embodiments described above will occur to those skilled in the art, in light of the above teachings.

What is claimed is:

1. An automotive power seat sliding device, comprising:

first and second lower rails adapted to be secured to a floor of a vehicle;

first and second upper rails slidably and respectively engaged with the first and second lower rails and adapted to support thereon a seat;

a cross beam member having both ends secured to the first and second upper rails respectively, so that the first and second upper rails slide on and along the first and second lower rails like a single unit;

at least one drive shaft extending along the first upper rail and having a spiral groove formed therearound;

a nut member secured to the first lower rail and operatively engaged with said drive shaft;

an electric power unit supported by said cross beam member for rotating said drive shaft about an axis thereof;

a supporting member connected to the first upper rail for rotatably supporting one end portion of said drive shaft; and a protector bracket secured to the first upper rail and having a recessed structure into which the other end of said drive shaft is received without contacting said recessed structure.

2. An automotive power seat sliding device as claimed in claim 1, in which said recessed structure of said protector bracket comprises:

a rear wall which faces the other end of said drive shaft; and a surrounding wall which surrounds a cylindrical wall of the other end of said drive shaft.

3. An automotive power seat sliding device as claimed in claim 2, in which said rear wall is formed, at a portion facing the other end of said drive shaft, with a circular opening.

4. An automotive power seat sliding device as claimed in claim 3, in which the diameter of said circular opening is smaller than the diameter of said drive shaft.

5. An automotive power seat sliding device as claimed in claim 4, in which the other end of said drive shaft is tapered.

6. An automotive power seat sliding device as claimed in claim 1, in which said electric power unit comprises:

an electric motor supported by said cross beam member;

a transmission shaft extending along said cross beam member and driven by said electric motor;

a transmission mechanism supported by said cross beam member and transmitting the rotation of said transmission shaft to said drive shaft; and a transmission case secured to said cross beam member for housing therein said transmission mechanism, said transmission case including said supporting member.

* * * * *